United States Patent [19]

Saitoh

[11] Patent Number: 4,815,028

[45] Date of Patent: Mar. 21, 1989

[54] DATA RECOVERY SYSTEM CAPABLE OF PERFORMING TRANSACTION PROCESSING IN PARALLEL WITH DATA RECOVERY PROCESSING

[75] Inventor: Junko Saitoh, Tokyo, Japan

[73] Assignee: NEC Corporation, Tokyo, Japan

[21] Appl. No.: 42,026

[22] Filed: Apr. 24, 1987

[30] Foreign Application Priority Data

Apr. 28, 1986 [JP] Japan .............................. 61-100009

[51] Int. Cl.$^4$ .............................................. G06F 1/00
[52] U.S. Cl. ..................................................... 364/900
[58] Field of Search ............................... 364/200, 900

[56] References Cited

U.S. PATENT DOCUMENTS

| 4,205,374 | 5/1980 | Bardsley, III et al. | 364/200 |
| 4,393,458 | 7/1983 | Fung | 364/900 |
| 4,598,357 | 7/1986 | Swenson et al. | 364/200 |

Primary Examiner—Raulfe B. Zache
Attorney, Agent, or Firm—Foley & Lardner, Schwartz, Jeffery, Schwaab, Mack, Blumenthal & Evans

[57] ABSTRACT

For use in a computer system, a data recovery system comprises an information producing unit for producing block-up information for data blocks which must be recovered to before images after occurrence of a system failure. Before such data blocks are recovered, other data blocks are either subjected to a transaction processing program or stored in a data file without waiting completion of the data recovery. The data blocks for which the block-up information is produced, are either subjected to the transaction processing program or stored in the data file after a block-up releasing unit deletes the block-up information upon completion of the data recovery. The data recovery system is operable even upon occurrence of an additional system failure during progress of the data recovery.

4 Claims, 6 Drawing Sheets

DATA RECOVERY SYSTEM CAPABLE OF PERFORMING TRANSACTION PROCESSING IN PARALLEL WITH DATA RECOVERY PROCESSING

BACKGROUND OF THE INVENTION

This invention relates to a data recovery system for use in a data processing or computer system which is used for carrying out data processing in compliance with a transaction processing program on data blocks memorized in a data file on a block by block basis.

Various data recovery systems are already known. The data recovery system is used for recovering those of the data blocks which are damaged or otherwise adversely affected in the data file due to a system failure or system down. In other words, the data recovery system is used for carrying out data recovery on the data blocks which should be recovered into recovered blocks. For such a data recovery system, the data processing system is operable in combination with the data file and a recovery log file. The transaction processing program specifies data retrieval and data renewal among others. The data processing system comprises a block memory area, an activation controlling arrangement responsive to a first control signal for controlling activation of the transaction processing program, a block transferring arrangement for transferring data blocks during the data retrieval from the data file to the block memory area for storage therein as memorized blocks, a block retrieving arrangement for retrieving during the data retrieval those of the memorized blocks from the block memory area for data processing in compliance with the transaction processing program which are specified by the transaction processing program, a data updating or renewing arrangement for updating during the data renewal those of the memorized blocks in the block memory area into updated blocks which are specified by the transaction processing program, and a log storing arrangement coupled to the data updating arrangement for storing log data in the recovery log file upon renewal of the memorized blocks in the block memory area into the updated blocks. The data recovery system includes a log memory area, a log transferring arrangement for transferring the log data from the recovery log file to the log memory area, and a block storing arrangement for storing during the data renewal and the data recovery the updated and the recovered blocks in the data file from the block memory area. The data recovery is carried out on restarting or rerunning the transaction processing program after occurrence of the system failure.

In a conventional data recovery system, the transaction processing program is again activated after completion of the data recovery. It is to be noted in this connection that some of the data blocks need not be recovered even for an occurrence of the system failure and can be processed before completion of the data recovery of the data blocks which must be recovered.

SUMMARY OF THE INVENTION

It is therefore an object of the present invention to provide a data recovery system wherein data recovery is carried out only on data blocks which must be recovered.

It is another object of this invention to provide a data recovery system of the type described, wherein a transaction processing program can at once be restarted after occurrence of a system failure on data blocks which need not be recovered.

It is still another object of this invention to provide a data recovery system of the type described, whereby a data processing system is operable at a high speed.

Other objects of this invention will become clear as the description proceeds.

In describing the gist of this invention, it is possible to define that a data recovery system is used in a data processing system which is operable in combination with a data file and a recovery log file and in compliance with a transaction processing program specifying data retrieval and data renewal and comprises a block memory area into which data blocks are transferred from the data file, activation controlling means responsive to a first control signal for controlling activation of the transaction processing program, block retrieving means for retrieving during the data retrieval those of the data blocks from the block memory area for data processing in compliance with the transaction processing program which are specified by the transaction processing program, data updating means for updating during the data renewal those of the data blocks in the block memory area into updated blocks which are specified by the transaction processing program, and log storing means coupled to the data updating means for storing log data in the recovery log file upon renewal of data blocks in the block memory area into the updated blocks. In order to carry out data recovery of those of the data blocks in the block memory area into recovered blocks which should be recovered, the above-defined data recovery system includes a log memory area, log transferring means for transferring the log data from the recovery log file to the log memory area, and block storing means for storing during the data renewal and the data recovery the updated and the recovered blocks in the data file from the block memory area.

According to this invention, the afore-defined data recovery system comprises information producing means coupled to the log memory area and responsive to a second control signal for producing block-up information indicative of each data block which should be recovered, first deferring means coupled to the block retrieving means and the information producing means for deferring retrieval of those of the data blocks which are indicated by the block-up information as blocked-up blocks, second deferring means coupled to the block storing means and the information producing means for deferring storage of the blocked-up blocks in the data file, and control signal producing means for producing the second control signal upon carrying out the data recovery and thereafter the first control signal to activate the transaction processing program on each data block which is not one of the blocked-up blocks.

DESCRIPTION OF THE PREFERRED EMBODIMENT

Figure 1:
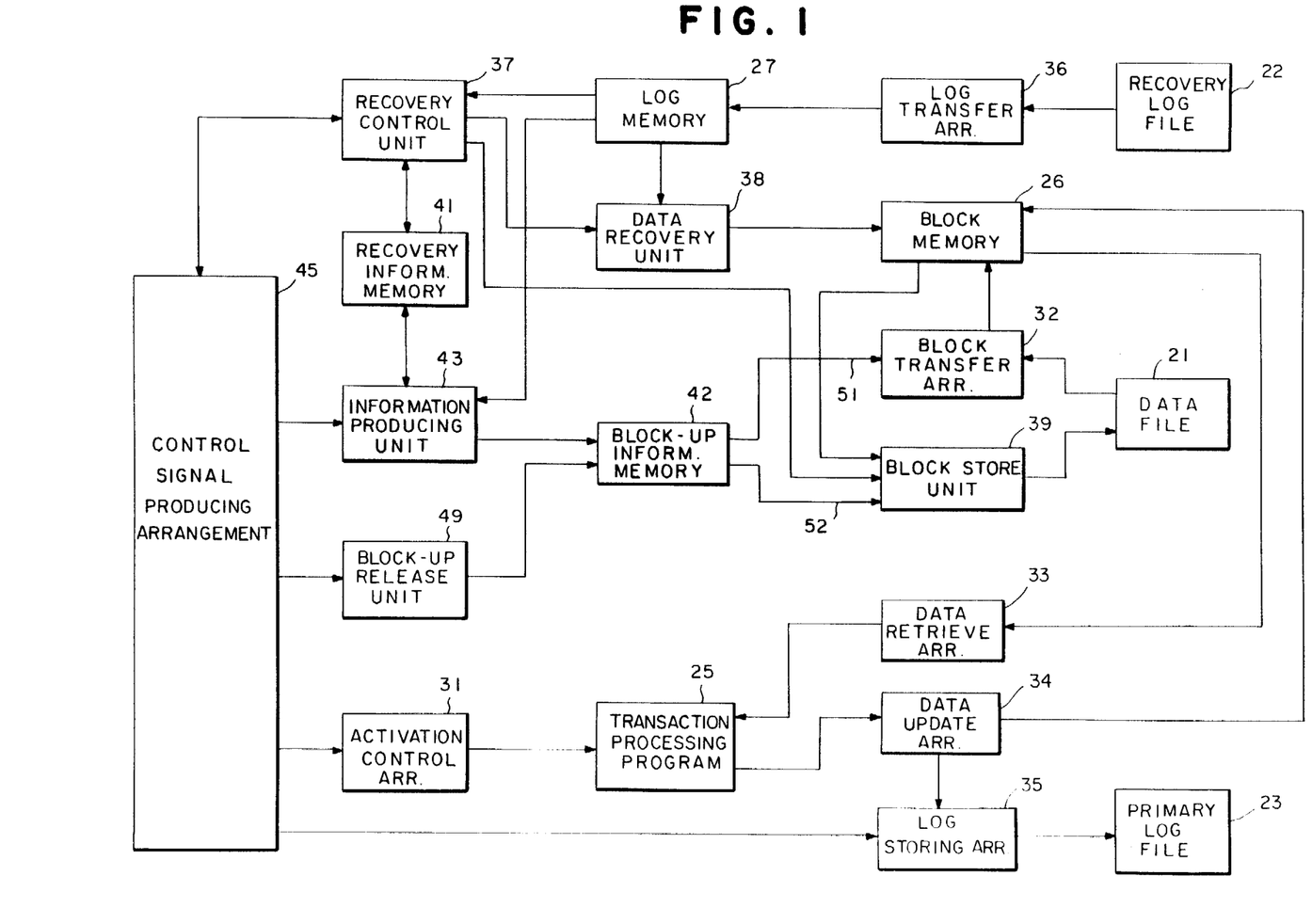
FIG. 1 is a block diagram of a data processing system which includes a data recovery system according to an embodiment of the instant invention.

Referring to FIG. 1, a data processing or computer system includes a data recovery system according to a preferred embodiment of the present invention. The data processing system is operable in combination with a data file 21 for memorizing data blocks on a block by block basis as file data blocks, a recovery log file 22, and a primary log file 23 and in compliance with a transaction processing program 25 which is depicted as a structural element of the data processing system merely for convenience of illustration. The transaction processing program 25 specifies data retrieval and data renewal besides data processing in the manner which will presently become clear.

The data processing system comprises a block memory area 26 and a log memory area 27. Responsive to a first control signal which will later be described, an activation controlling arrangement 31 controls activation of the transaction processing program 25. It is convenient depending on the circumstances to regard the log memory area 27 as a structural element of the data recovery system.

It will be now assumed that the transaction processing program 25 is activated. Controlled by the transaction processing program 25 in the manner known in the art, a block transferring arrangement 32 transfers during the data retrieval those of the file data blocks from the data file 21 to the block memory area 26 which are specified by the transaction processing program 25 as specified data blocks. Also during the data retrieval, a data retrieving arrangement 33 supplies the transaction processing program 25 with each datum which is selected from the specified data blocks by the transaction processing program 25. Such data of the specified data blocks are data processed in compliance with the transaction processing program 25 into processed data. Operation of the data transferring and the data retrieving arrangements 32 and 33 will be described more in detail in the following.

During the data renewal, a data updating or renewing arrangement 34 substitutes the processed data on the block by block basis as processed data blocks in the block memory area 26 for those of the specified data blocks which are found in the meantime to be out of date in the known manner and are called before images in the art. In other words, the data updating arrangement 34 updates those of the data blocks in the block memory area 26 which are specified by the transaction processing program 25. In this manner, the block memory area 26 memorizes various data blocks as memorized data blocks. During progress of the transaction processing program 25, some of the memorized data blocks are the specified data blocks. Some others of the memorized data blocks are the processed data blocks. Operation of the data updating arrangement 34 will later be described more in detail.

A log storing arrangement 35 is coupled to the data updating arrangement 34. Whenever the memorized data blocks are updated in the block memory area 26, the log storing arrangement 35 stores a data renewal log datum in the primary log file 23 as one of log data. In the manner which will become clear as the description proceeds, the log storing arrangement 35 stores various other log data in the primary log file 23. Such log data are transferred from the primary log file 23 to the recovery log file 22 in the manner known in the art and are memorized in the recovery log file 22 as file log data. It is therefore possible to understand that the log storing arrangement 35 serves to store the file log data in the recovery log file 22.

When the data processing system is subjected to a system failure or system down, operation of the transaction processing program 25 is suspended. The data recovery system is put into operation of carrying out data recovery for those of the file data blocks which should be recovered to the before images. In other words, the data recovery system recovers some of the data blocks in the block memory area 26 into recovered data blocks.

In order to carry out the data recovery, the data recovery system includes a log transferring arrangement 36 for transferring the file log data from the recovery log file 22 to the log memory area 27. The file log data are successively stored in the log memory area 27 as memorized log data in this manner.

Responsive to the memorized log data, a recovery controlling unit 37 controls a data recovering unit 38 and a block storing unit 39. Into the recovered data blocks, the data recovering unit 38 is controlled to recover those of the processed data blocks which are damaged or otherwise adversely affected by the system failure. The recovered data blocks are stored in the block memory area 26 as the memorized data blocks in addition to the specified data blocks and those of the processed data blocks which need not be recovered. The block storing unit 39 is controlled to transfer the updated and the recovered data blocks from the block memory area 26 to the data file 21. In this manner, the block storing unit 39 stores the updated and the recovered data blocks in the data file 21. It is now understood that a combination of the recovery controlling unit 37, the data recovering unit 38, and the block storing unit 39 serves as a block storing arrangement coupled to the log memory area 27 for storing during the data renewal and the data recovery the updated and the recovered data blocks in the data file 22. Operation of the recovery controlling, the data recovering, and the block storing units 37 through 39 will be described in greater detail in the following.

In the example being illustrated, the data recovery system comprises a recovery information memory area 41 and a block-up information memory area 42. Coupled to the log memory area 27 and responsive to a second control signal which will presently be described, an information producing unit 43 produces block-up information indicative of each memorized data block which should be recovered in the block memory area 26. Among the memorized data blocks, those indicated by the block-up information are herein referred to as blocked-up data blocks. The block-up information is stored in the block-up information memory area 42. Controlled by the recovery controlling unit 37, a control signal producing arrangement 45 produces the first and the second control signals and other control signals which will shortly be described. Operation of the information producing unit 43 and the control signal producing arrangement 45 will be described in detail hereunder.

Figures 2, 3, 6:
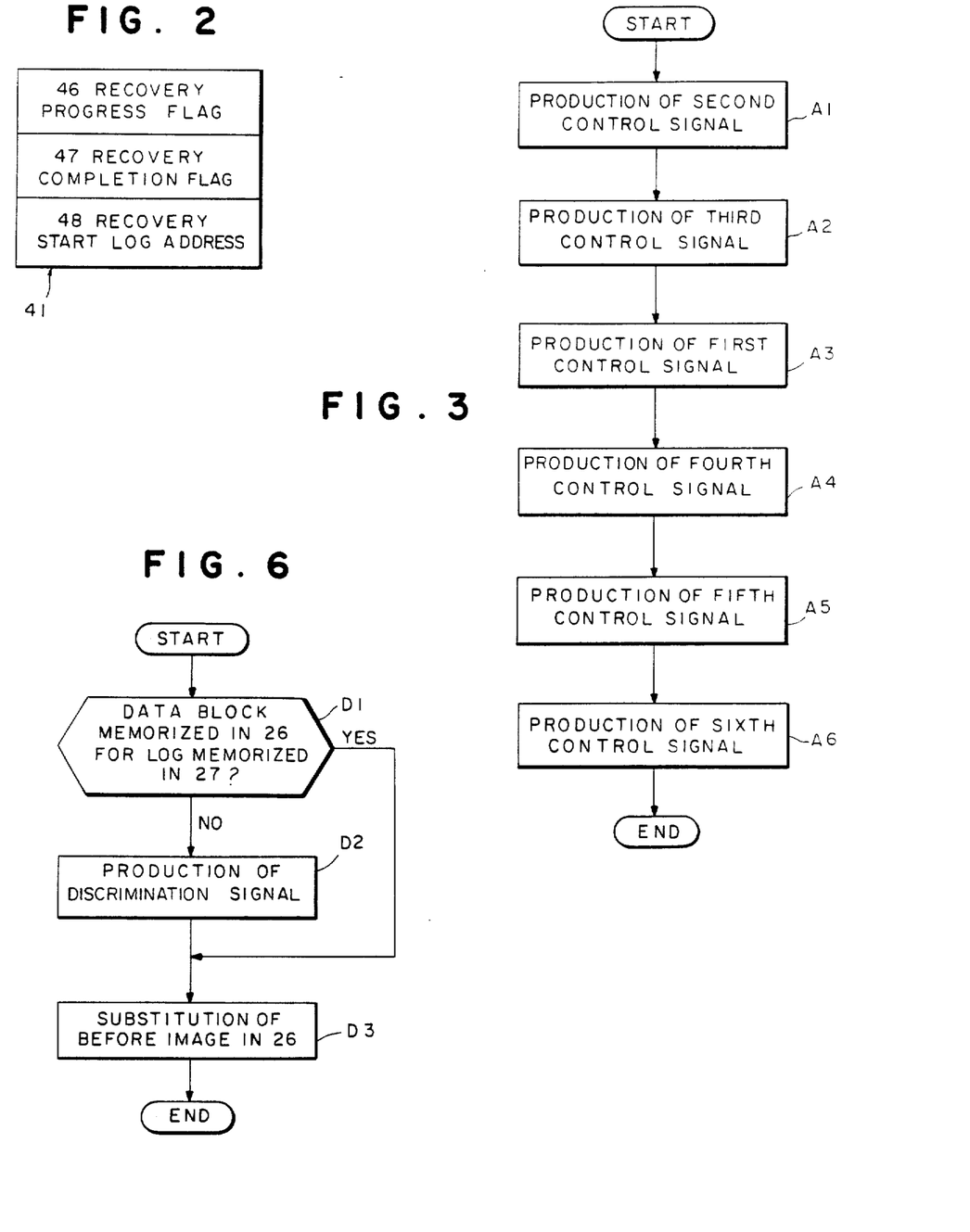
FIG. 2 is a detailed diagram of a recovery information memory area used in the data recovery system shown in FIG. 1.
FIG. 3 is a flow chart for use in describing operation of a control signal producing arrangement used in the data recovery system depicted in FIG. 1.
FIG. 6 is a flow chart for use in describing operation of a data recovering unit used in the data recovery system depicted in FIG. 1.

Turning to FIG. 2 for a short while, the recovery information memory area 41 has recovery progress and completion flag fields 46 and 47 and a recovery start log address field 48. In the manner which will become clear as the description proceeds, the recovery progress flag field 46 is for a recovery progress flag. The recovery completion flag field 47 is for a recovery completion flag. The recovery start log address field 48 is for a recovery start log address of the recovery log file 22 which is described above in conjuction with FIG. 1.

Further turning to FIG. 3, operation of the control signal producing arrangement 45 will be described. In the manner which will become clear as the description proceeds, operation of some structural elements proceeds in parallel.

Whenever the recovery controlling unit 37 detects necessity of the data recovery in the manner known in the art, the control signal producing arrangement 45 is put into operation and delivers the second control signal at first to the information producing unit 43 at a first step A1. When operation of the information producing unit 43 comes to an end, the control signal producing arrangement 45 delivers a third control signal to the log storing arrangement 35 at a second step A2 and then the first control signal to the activation controlling arrangement 31 at a third step A3. Operation of the transaction processing program 25, once suspended upon occurrence of the system failure, is again activated by the first control signal.

Having again activated operation of the transaction processing program 25, the control signal producing arrangement 45 delivers a fourth control signal back to the recovery controlling unit 37 at a fourth step A4 to again put the recovery controlling unit 37 into operation.

Upon completion of the data recovery, the control signal producing arrangement 45 delivers a fifth control signal to the log storing arrangement 35 at a fifth step A5. Immediately thereafter, the control signal producing arrangement 45 produces a sixth control signal at a sixth step A6. Operation of the control signal producing arrangement 45 comes to an end.

The sixth control signal is termed a releasing signal heretobefore. The first through the sixth steps A1 to A6 will be called A1 through A6 steps in the following.

It is to be noted in conjunction with FIGS. 1 and 3 that the log storing arrangement 35 is operable during progress of the transaction processing program 25. When a system failure takes place, the log storing arrangement 35 stores a recovery start log datum in the primary log file 23. Operation of the transaction processing program 25 is suspended. The control signal producing arrangement 45 produces the second control signal at the A1 step to put the information producing unit 43 into operation at first during the data recovery. After the block-up information is produced for all the data blocks which should be recovered into the recovered data blocks, the log storing arrangement 35 is put into operation by the third control signal produced at the A2 step. The log storing arrangement 35 is now capable of storing the data renewal log data in the primary log file 23 after the transaction processing program 25 is restarted by the first control signal produced at the A3 step. When operation of the transaction processing program 25 comes to an end, the log storing arrangement 35 stores a transaction end log datum in the primary log file 23. When the data recovery comes to an end, the fifth control signal is produced at the A5 step to make the log storing arrangement 35 store a recovery completion log datum in the primary log file 23.

Turning back to FIG. 1, the releasing signal is supplied to a block-up releasing unit 49. Activated by the releasing signal, the block-up releasing unit 49 deletes the block-up information from the block-up information memory area 42. It should be noted that the block-up information is delivered from the block-up information memory area 42 to the block transferring arrangement 32 and to the block storing unit 49 through first and second connections 51 and 52. As will later become clear, the first and the second connections 51 and 52 serve as first and second deferring arrangements.

Figure 4:
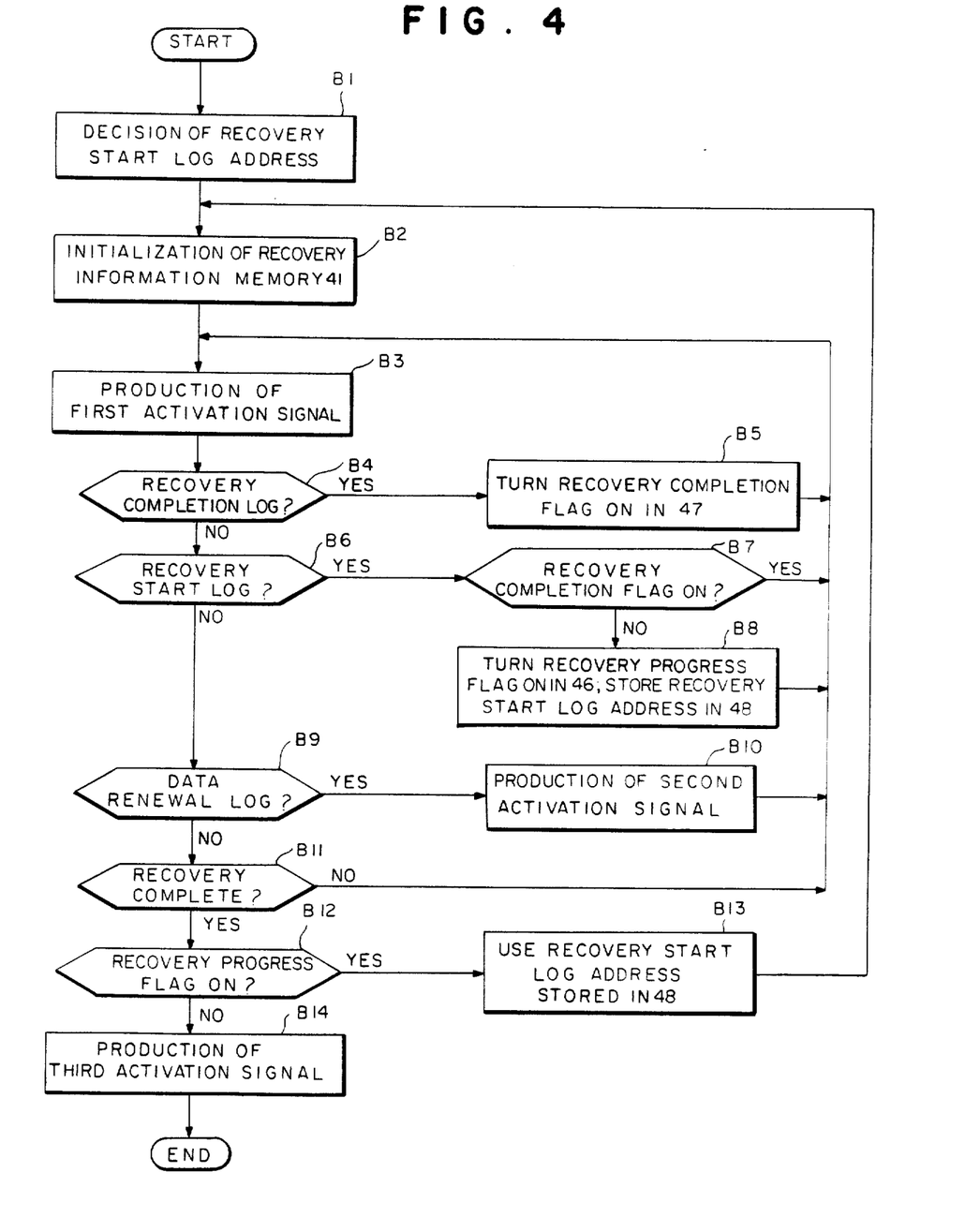
FIG. 4 is a flow chart for use in describing operation of a recovery controlling unit used in the data recovery system illustrated in FIG. 1.

Referring now to FIG. 4, the description will proceed to operation of the recovery controlling unit 37 illustrated in connection with FIG. 1. In the example being illustrated, the recovery controlling unit 37 is put into operation by the fourth control signal which is produced by the control signal producing arrangement 45 at the A4 step after operation of the information producing unit 43 comes to an end and while the transaction processing program 25 is in progress. It may be mentioned here that the file log data are memorized in the recovery log file 22 time sequentially in consecutive addresses for the data processing system being illustrated.

Put into operation, the recovery controlling unit 37 indicates at a B1 step recovery start log address which is decided by the information producing unit 43 and from which the consecutive addresses of the recovery log file 22 should be checked backwardly time sequentially. Immediately thereafter, the recovery controlling unit 37 initializes the recovery information memory area 41 at a B2 step. Next, the recovery controlling unit 37 delivers a first activation signal at a B3 step to the log transferring arrangement 36 through a connection which is not depicted in FIG. 1 merely for simplicity of illustration. Activated by the first activation signal, the log transferring arrangement 36 loads the log memory area 27 with one of the file log data that is memorized in the recovery log file 22 as a recovery begin log datum at the recovery start log address.

The recovery begin log datum will be none of the data renewal log data and the recovery completion log datum. Under the circumstances, the recovery controlling unit 37 skips a loop consisting of B4 and B5 steps. The recovery begin log datum may be the recovery start log datum. In this event, the recovery controlling unit 37 confirms at a B6 step that the recovery start log datum is transferred to the log memory area 27.

It is to be noted in this connection that the recovery completion log datum will eventually be detected at the B4 step. The B5 step follows at which the recovery completion flag is switched on in the recovery completion flag field 47. At a B7 step, it is detected that the recovery completion flag is on due to completion of the data recovery for the system failure that took place next previous to the system failure being considered. The B7 step returns to the B3 step without proceeding to a B8 step of switching the recovery progress flag on in the recovery progress flag field 46 and of storing the recovery start log address in the recovery start log address field 48. The log transferring arrangement 36 is again activated to transfer a next previous log datum to the log memory area 27.

Unless the log transferring arrangement 36 transfers one of the data renewal log data to the log memory area 27, the recovery controlling unit 37 skips another loop consisting of B9 and B10 steps. At a B11 step, the recovery controlling unit 37 confirms the fact that the transaction end log datum is not yet transferred to the log memory area 27. This shows that the data recovery is not yet complete. The B11 step returns to the B3 step. In this manner, the log transferring arrangement 36 is repeatedly activated to read the recovery log file 22 from the recovery start log address revesedly along the consecutive addresses.

Each time when the recovery controlling unit 37 finds at the B9 step that the data renewal log data are transferred to the log memory area 27, the recovery controlling unit 37 delivers a second activation signal at the B10 step to the data recovering unit 38. In this manner, the recovery controlling unit 37 controls the data recovering unit 38. When operation of the data recovering unit 38 comes to an end in the manner which will later be described in detail, the B10 step returns to the B3 step.

When the transaction end log datum is found at the B11 step, the recovery controlling unit 47 knows completion of the data recovery. The B11 step proceeds to a B12 step. The recovery progress flag is not turned on because the B8 step is not carried out. As a consequence, the B12 step does not proceed to a B13 step but proceeds to a B14 step of delivering a third activation signal to the block storing unit 39. Controlling the block storing unit 39 in this manner, operation of the recovery controlling unit 37 comes to an end.

Figure 5:
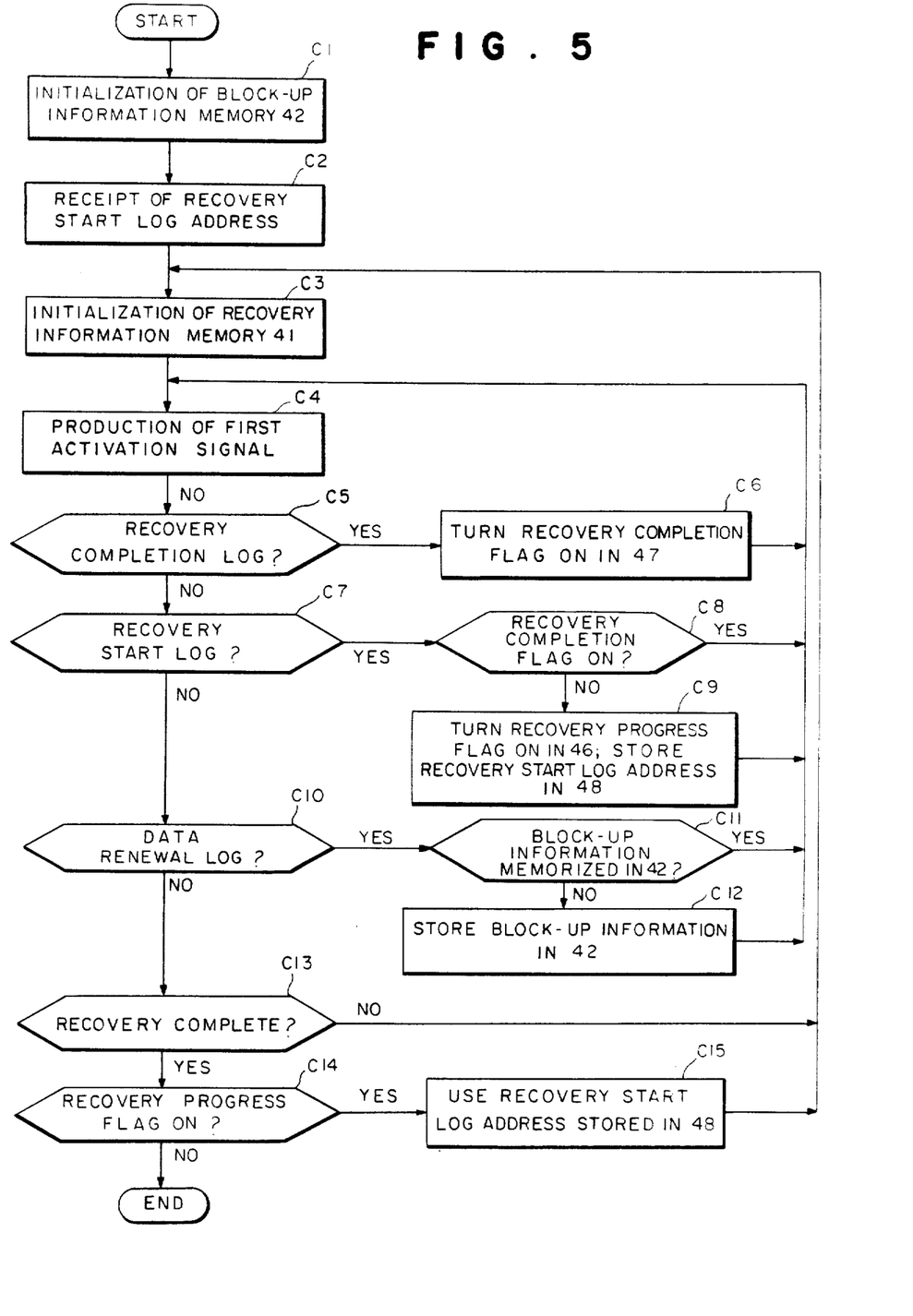
FIG. 5 is a flow chart for use in describing operation of an information producing unit used in the data recovery system shown in FIG. 1.

Referring to FIG. 5, operation of the information producing unit 43 will be described. Put into operation by the second control signal produced by the control signal producing arrangement 45 at the A1 step, the information producing unit 43 initializes the block-up information memory area 42 at a C1 step. Immediately thereafter, the information producing unit 43 decides at a C2 step the recovery start log address which is presently used in providing the recovery begin log datum of the type described in conjunction with FIG. 4 and is later used by the recovery controlling unit 37 at the B1 step.

Like the recovery controlling unit 37, the information producing unit 43 subsequently initializes the recovery information memory area 41 at a C3 step and then supplies at a C4 step the log transferring arrangement 36 with an activation signal which is equivalent to the first activation signal produced at the B3 step. Inasmuch as the recovery begin log datum is not the recovery completion log datum, the information producing unit 43 skips a loop consisting of C5 and C6 steps which are similar to the B4 and the B5 steps.

At a C7 step, the information producing unit 43 finds the recovery start log datum. The C7 step proceeds to a C8 step at which the information producing unit 43 checks the recovery completion flag field 47. Inasmuch as the recovery completion flag was switched on as a result of next previous occurrence of a system failure, the C8 step returns to the C4 step of again activating the log transferring arrangement 36. It is to be noted that a C9 step is not carried out in this event. Like the B8 step described above, the C9 step is for turning the recovery progress flag on in the recovery progress flag field 46 and for storing the recovery start log address in the recovery start log address field 48.

Unless the data renewal log data are transferred by the log transferring arrangement 36 to the log memory area 27, the information producing unit 43 skips another loop consisting of C10, C11, and C12 steps. The transaction end log datum would neither be transferred to the log memory area 27. Knowing at a C13 step that the data recovery is not yet complete, the information producing unit 43 again carries out the C4 step. The log transferring arrangement 36 is repeatedly activated.

When the information producing unit 43 finds at the C10 step that one of the data renewal log data is transferred by the log transferring arrangement 36 to the log memory area 27, the information producing unit 43 checks at the C11 step whether or not block-up information is already memorized in the block-up information memory area 42 for the data block which corresponds to the data renewal log datum under consideration. If the block-up information is already memorized in the block-up information memory area 42, the C11 step returns to the C4 step. If the block-up information is not yet memorized in the block-up information memory area 42, the information producing unit 43 afresh stores block-up information at the C12 step in the block-up information memory area 42 and then returns to the C4 step. The information producing unit 43 produces the block-up information in this manner.

When the information producing unit 43 eventually finds at the C5 step that the recovery completion log datum is transferred to the log memory area 27, the C5 step proceeds to the C6 step of turning the recovery completion flag on in the recovery completion flag field 47. The C5 step returns to the C4 step and thence proceeds to the C5, the C7, and the C10 steps. At the C13 step, the information producing unit 43 knows that the data recovery is already complete. The C13 step proceeds to a C14 step of checking the recovery progress flag field 46. Inasmuch as the C9 step is not carried out, the recovery progress flag is off. As a result, the C14 step does not proceed to a C15 step. Instead, operation of the information producing unit 43 comes to an end.

Turning to FIG. 6, operation of the data recovering unit 38 will be described. Put into operation by the second activation signal produced by the recovery controlling unit 37 at the B10 step, the data recovering unit 38 refers at a D1 step to the block and the log memory areas 26 and 27. When no data block is found at the D1 step in the block memory area 26 in correspondence to each log datum memorized in the log memory area 27, a D2 step is carried out to deliver a discrimination signal to the block transfer arrangement 32. The discrimination signal indicates whether or not the data recovery is carried out by the data recovering unit 38. When the block memory area 26 memorizes a data block in correspondence to a log datum memorized in the log memory area 27, the data recovering unit 38 proceeds to a D3 step of substituting a before image in the block memory area 26 in the manner known in the art for the data block which corresponds to the log datum in question. Operation of the data recovering unit 38 comes to an end. In FIG. 4, the B10 step returns to the B3 step.

Figure 7:
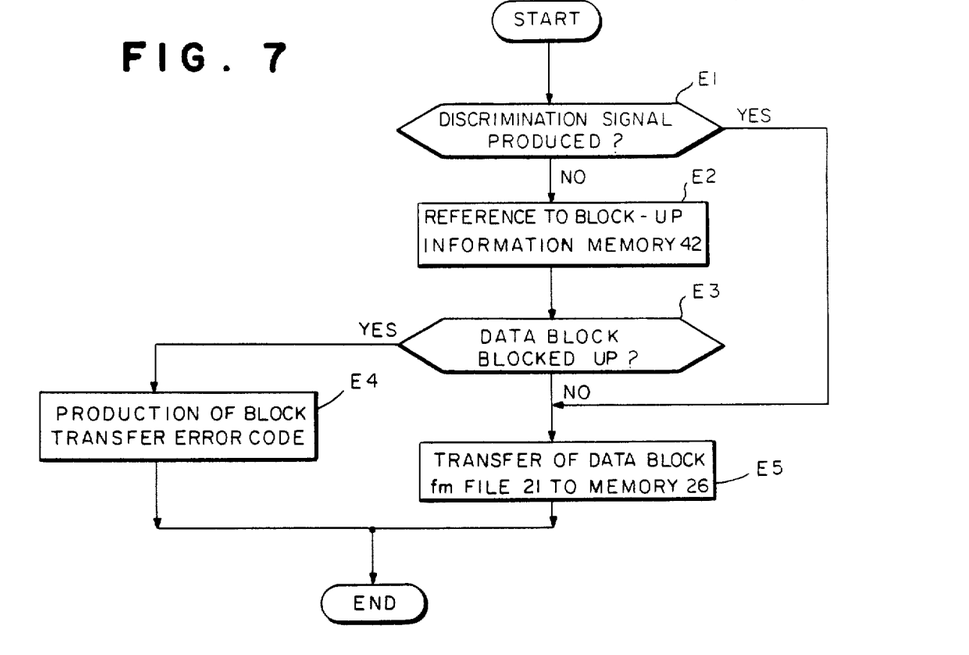
FIG. 7 is a flow chart for use in describing operation of a block transferring arrangement used in the data processing system illustrated in FIG. 1.

Referring now to FIG. 7, operation of the block transferring arrangement 32 will be described. The block transferring arrangement 32 is put into operation on carrying out the data retrieval when the data retrieving arrangement 33 is activated by the transaction processing program 25 in the manner which will shortly be described. The block transferring arrangement 32 is operable also during the data renewal specified by the transaction processing program 25. In the manner indicated at an E1 step, the operation proceeds to E2 and E3 steps when the discrimination signal is not produced by the data recovering unit 38 at the D2 step, namely, when the data retrieval is carried out rather than the data renewal. At the E2 step, the block transferring arrangement 32 refers to the block-up information memory area 42. At the E3 step, the block transferring arrangement 32 checks whether or not the block-up information is memorized in the block-up information memory area 42. If the block-up information is memorized, a block transfer error code is produced at an E4 step. The block transfer error code indicates blockade of a data block which should otherwise be transferred from the data file 21 to the block memory area 26. Operation of the block transferring arrangement 32 comes to an end. If the block-up information is not memorized, an E5 step is carried out to transfer the data block from the data file 21 to the block memory area 26. The operation comes to an end.

When the discrimination signal is delivered from the data recovering unit 38, namely, when the data renewal is carried out, the E1 step proceeds directly to the E5 step. The operation comes to an end. Each time when operation of the block transferring arrangement 32 comes to an end, the data retrieving arrangement 33 is again put into operation during the data retrieval in the manner which will presently be described.

Figure 8:
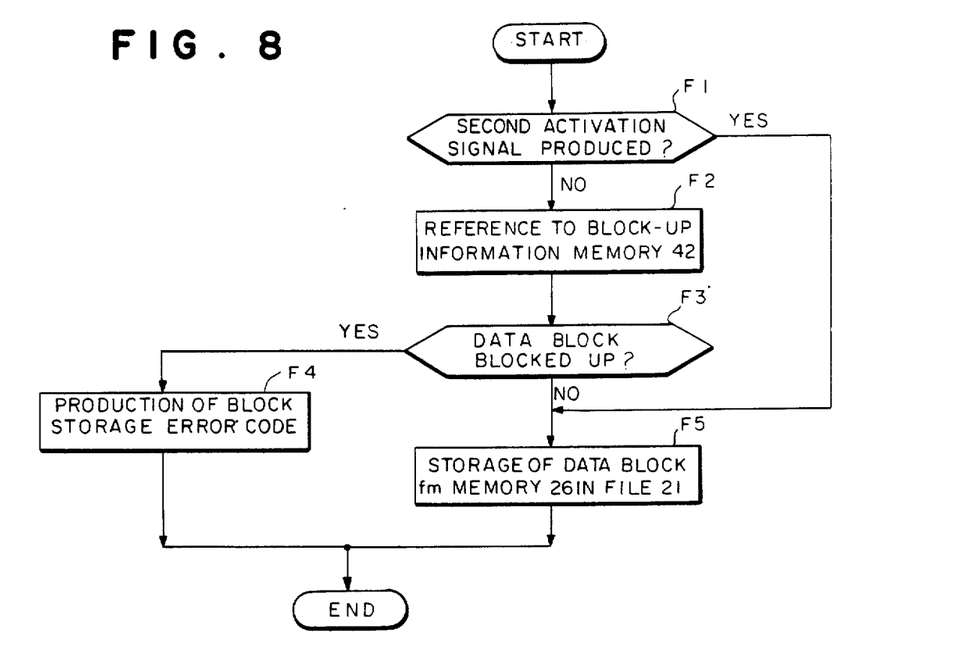
FIG. 8 is a flow chart for use in describing operation of a block storing unit used in the data recovery system depicted in FIG. 1.

Turning to FIG. 8, operation of the block storing unit 39 will be described. The block storing unit 39 is put into operation during the data renewal when the data updating arrangement 34 is activated by the transaction processing program 25. In the manner indicated at an F1 step, the operation proceeds to F2 and F3 steps while the recovery controlling unit 37 does not produce the second activation signal at the B10 step, namely, while the data recovery is not carried out. At the F2 step, the block storing unit 39 refers to the block-up information memory area 42. At the F3 step, the block storing unit 39 checks presence or absence of block-up information in the block-up information memory area 42. Detecting the presence, the block storing unit 39 produces a block storage error code at an F4 step. The block storage error code indicates blockade of a data block which should otherwise be stored in the data file 21 from the block memory area 26. If no block-up information is present, an F5 step is carried out to store the data block of the block memory area 26 in the data file 21. In either event, operation of the block storing unit 39 comes to an end. The data updating arrangement 34 is again put into operation during the data renewal as will presently be described.

When the second activation signal is detected at the F1 step, the F1 step proceeds directly to the F5 step. Operation of the block storing unit 39 comes to an end to again put the data updating arrangement 34 into operation.

Figure 9:
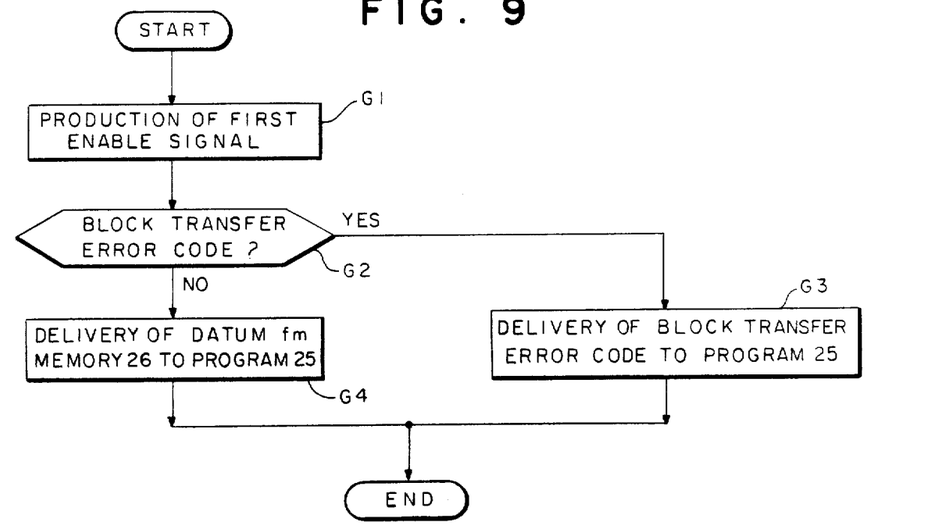
FIG. 9 is a flow chart for use in describing operation of a data retrieving arrangement used in the data processing system shown in FIG. 1.

Referring to FIG. 9, operation of the data retrieving arrangement 33 will now be described. Put into operation by the transaction processing program 25 during the data retrieval, the data retrieving arrangement 33 supplies at a G1 step the block transferring arrangement 32 with a first enable signal to put the block transferring arrangement 32 into operation in the manner described above with reference to FIG. 7. If produced by the block transferring arrangement 32 at the E4 step, the block transfer error code is sent to the data retrieving arrangement 33. When operation of the block transferring arrangement 32 comes to an end, the data retrieving arrangement 33 checks at a G2 step presence or absence of the data transfer error code. If present, the block transfer error code is sent back to the transaction processing program 25 at a G3 step. Operation of the data retrieving arrangement 33 comes to an end. The transaction processing program 25 proceeds so as again to carry out the data retrieval.

When the block transfer error code is absent, the datum or data of the data block are sent from the block memory area 26 to the transaction processing program 25 at a G4 step. Operation of the data retrieving arrangement 33 comes to an end. The transaction processing program 25 carries out the data processing on the datum or data.

Figure 10:
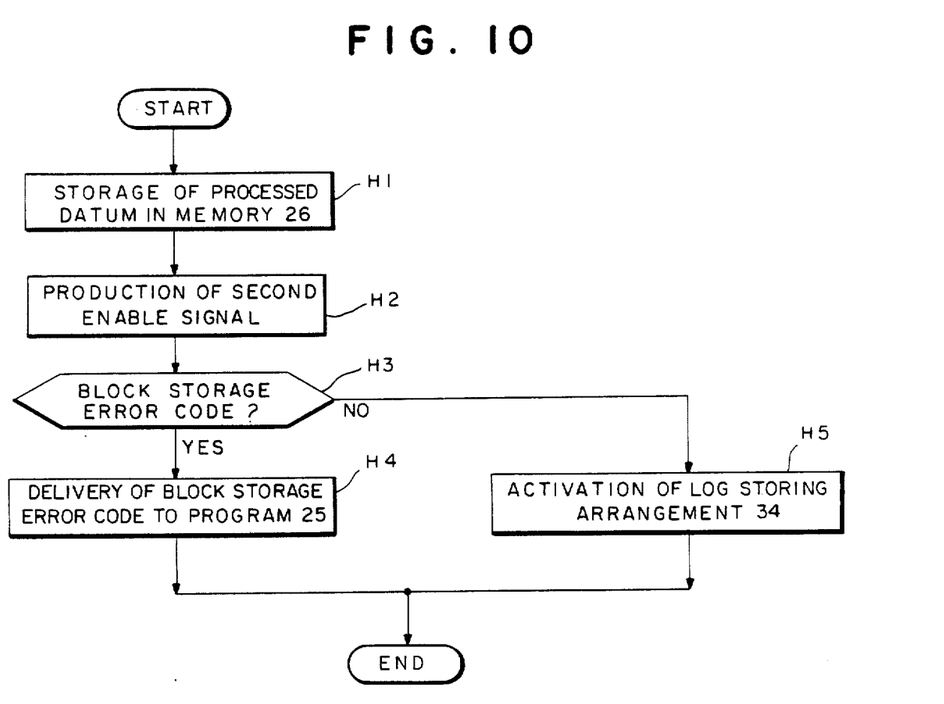
FIG. 10 as a flow chart for use in describing operation of a data updating arrangement used in the data processing system illustrated in FIG. 1.

Turning to FIG. 10, operation of the data updating arrangement 34 will be described. Put into operation by the transaction processing program 25 during the data renewal, the data updating arrangement 34 stores at an H1 step the processed datum or data in the block memory area 26 on the block by block basis as the processed data block. Next, the data updating arrangement 34 supplies at an H2 step the block storing unit 39 with a second enable signal to put the block storing unit 39 into operation. When operation of the block storing unit 39 comes to an end, the data updating arrangement 34 checks at an H3 step presence or absence of the block storage error code produced by the block storing unit 39 at the F4 step. If present, the block storage error code is sent at an H4 step to the transaction processing program 25. Operation of the data updating arrangement 34 comes to an end. The transaction processing program 25 proceeds so as to carry out the data retrieval for a next datum of the data block memorized in the block memory area 26.

If the block storage error code is absent, the data updating arrangement 34 activates the log storing arrangement 35 at an H5 step. Activated, the log storing arrangement 35 loads the primary log file 23 with a data renewal log datum. After this operation of the log storing arrangement 35, the data updating arrangement 34 informs the transaction processing program 25 of an end of operation of the data updating arrangement 34. The transaction processing program 25 proceeds to the data retrieval for another datum of the memorized data block.

Reviewing FIGS. 1 through 10, it is now understood that a combination of the block-up information memory area 42, the information producing unit 43, and the block-up releasing unit 49 serves in cooperation with the recovery information memory area 41 as an information producing arrangement which is coupled to the log memory area 27 and responsive to the second control signal for producing block-up information indicative of each data block which should be recovered. When the block-up information is produced for a data block, that data block is prevented from being transferred from the data file 21 to the block memory area 26 in the manner described in conjuction with the E4 step, being retrieved from the block memory area 26 for supply to the transaction processing program 25 as described in connection with the G3 step, being stored from the block memory area 26 in the data file 21 in the manner pointed out in conjunction with the F4 step, and being updated in the block memory area 26 as described in connection with the H4 step.

In addition, the information producing unit 43 serves in cooperation with the recovery information memory area 41 as an information storing arrangement responsive to the second control signal for storing the block-up information in the block-up information memory area 42 for each data block which should be recovered. The block-up releasing unit 49 serves as an information deleting arrangement responsive to the releasing signal for deleting the block-up information from the block-up information memory area 42. The data retrieving arrangement 35 may alternatively be called a block retrieving arrangement. The recovery controlling unit 37 is activated by the fourth control signal in order to deal with the recovery completion log datum which is stored in the primary log file 23 in response to the fifth control signal.

It should furthermore be understood that the first connection 51 is coupled to the information producing arrangement and to the block retrieving arrangement through the block transferring arrangement 32. The first connection serves to defer retrieval of the blocked-up data blocks from the block memory area 26 until completion of the data recovery. The second connection 52 is coupled to the block storing arrangement described earlier and to the information producing arrangement to defer storage of the blocked-up data blocks in the data file 21 until completion of the data recovery. From a different view, it is possible to appreciate that the first and the second deferring arrangements are first and second classifying arrangements. During the data retrieval, the first classifying arrangement classifies the data blocks of the block memory area 26 into first and second groups. The data block or blocks of the first group must be retrieved after the data recovery. The data block or blocks of the second group can be subjected to the transaction processing program 25 at once without waiting completion of the data recovery. During the data renewal, the second classifying arrangement classifies the data blocks of the block memory area 26 into third and fourth groups. The data block or blocks of the third group must be stored in the data file 21 after the data recovery. The data block or blocks of the fourth group can be stored in the data file 21 at once without waiting completion of the data recovery.

It is to be noted in connection with FIGS. 1 through 10 that an additional system failure may take place during the data recovery. The system failure described heretobefore, will be named a main system failure for discrimination from the additional system failure. The data recovery system detects the additional system failure like the main system failure.

As described earlier in conjuction with FIG. 3, the log storing arrangement 35 is activated by the third control signal produced by the control signal producing arrangement 45 at the A2 step. When the additional system failure takes place, the log storing arrangement 35 stores another recovery start log datum in the primary log file 23. After the first control signal is produced by the control signal producing arrangement 45 at the A3 step to again activate the transaction processing program 25, the fourth control signal is produced at the A4 step to again activate the recovery controlling unit 37 for processing of the additional system failure. The recovery start log datum produced upon occurrence of the additional system failure, will be called an additional recovery start log datum.

In FIG. 5, the information producing unit 43 is already put into operation by the second control signal produced by the control signal producing arrangement 45 at the A1 step. At the C7 step, the information producing unit 43 will detect a recovery start log datum. It should be noted that the recovery completion flag would be kept off in the recovery completion flag field 47 when the additional system failure takes place during the data recovery. In this event, the recovery start log datum under consideration is the additional recovery start log datum. The C8 step therefore proceeds to the C9 step of turning the recovery progress flag on in the recovery progress flag field 46 and of storing the recovery start log address in the recovery start log address field 48 for the main system failure. The C9 step returns to the C4 step of again activating the log transferring arrangement 36. It is now understood that the recovery progress flag is switched on each time when a system failure takes place during progress of the data recovery.

Also in FIG. 5, the information producing unit 43 will eventually know completion of the data recovery by finding a transaction end log datum at the C13 step. This, however, is not true completion of the data recovery because the information producing unit 43 detects at the C14 step that the recovery progress flag is on in the recovery progress flag field 46. The C15 step is therefore carried out at which the information producing unit 43 uses the recovery start log address which was stored in the recovery start log address field 48 at the C9 step for the main system failure to again carry out production of the block-up information for the data block or blocks which must be recovered. In this manner, the block-up information is produced at first for the additional system failure and then for the main system failure.

In FIG. 4, the recovery controlling unit 37 deals with the additional recovery start log datum at the B6 through the B8 steps. The B8 step returns to the B3 step. Finding at the B12 step that the recovery progress flag is on in the recovery progress flag field 46, the recovery controlling unit 37 carries out the B13 step of using the recovery start log address which was stored in the recovery start log address field 48 at the B8 step for the main system failure. The B13 step returns to the B2 step to carry out the data recovery for the data block or blocks which must be dealt with. In this manner, the data recovery is carried out at first for the additional system failure and then for the main system failure.

In the manner described above by reviewing FIGS. 1 through 10, the recovery completion log datum is stored in the primary log file 23 when the control signal producing arrangement 45 produces the fifth control signal at the A5 step. The recovery completion log datum serves for both the main and the additional system failures.

What is claimed is:

1. A data recovery system used in a data processing system operating in combination with a data file and a recovery log file and in compliance with a transaction processing program specifying data retrieval and data renewal, said data processing system comprising:

a block memory area, block transferring means connected to said block memory area and said data file during said data retrieval for transferring data blocks from said data file to said block memory area, activation controlling means connected to said transaction processing program and responsive to a first control signal for controlling activation of said transaction processing program, data retrieving means connected to said block memory area and responsive to said transaction processing pogram for retrieving, during said data retrieval those of said data blocks from said block memory area for data processing in compliance with said transaction processing program which are specified by said transaction processing program, data updating means connected to said block memory area and responsive to said transaction processing program for updating during said data renewal those of said data blocks in said block memory area into updated blocks which are specified by said transaction processing program, log storing means connected to said data updating means for storing log data in said recovery log file upon renewal of data blocks in said block memory area into said updated blocks, said data recovery system operative for carrying out data recovery of those of said data blocks in said block memory area into recovered blocks which should be recovered and including a log memory area, log transferring means connected to said recovery log file and said log memory area for transferring said log data from said recovery log file to said log memory area, and block storing means connected to said block memory area and said data file for storing during said data renewal and recovery said updated and said recovered blocks in said data file from said block memory area, wherein the data recovery system further comprises:

information producing means connected to said log memory area and responsive to a second control signal for producing block-up information indicative of each data block which should be recovered in said block memory area;

said block transferring means connected to said information producing means for deferring retrieval of those of said data blocks which are indicated by said block-up information as blocked-up blocks;

said block transferring means connected to said information producing means for deferring storage of said blocked-up blocks in said data file; and control signal producing means connected to said activation controlling means and said information producing means for producing said second control signal upon carrying out said data recovery and thereafter said first control signal to activate said transaction processing program on each data block which is not one of said blocked-up blocks.

2. A data system as claimed in claim 1, wherein;

said information producing means comprises:

a block-up information memory area;

information storing means connected to said log memory area and responsive to said second control signal for storing said block-up information in said block-up information memory area for each data block which should be recovered; and information deleting means connected to said block-up information memory area and responsive to a releasing signal for deleting said block-up information from said block-up information memory area;

said block transferring means and said block storing means being connected to said block-up information memory area;

said control signal producing means further including means for producing said releasing signal after said transaction processing program is processed on those of said data blocks which are not said blocked-up blocks.

3. A data recovery system as claimed in claim 2, wherein said control signal producing means is operative for producing said first control signal next subsequent to production of said second control signal.

4. A data recovery system as claimed in claim 3, wherein said control signal producing means is operative for again producing said first control signal after production of said releasing signal.

* * * * *